Figure 1:
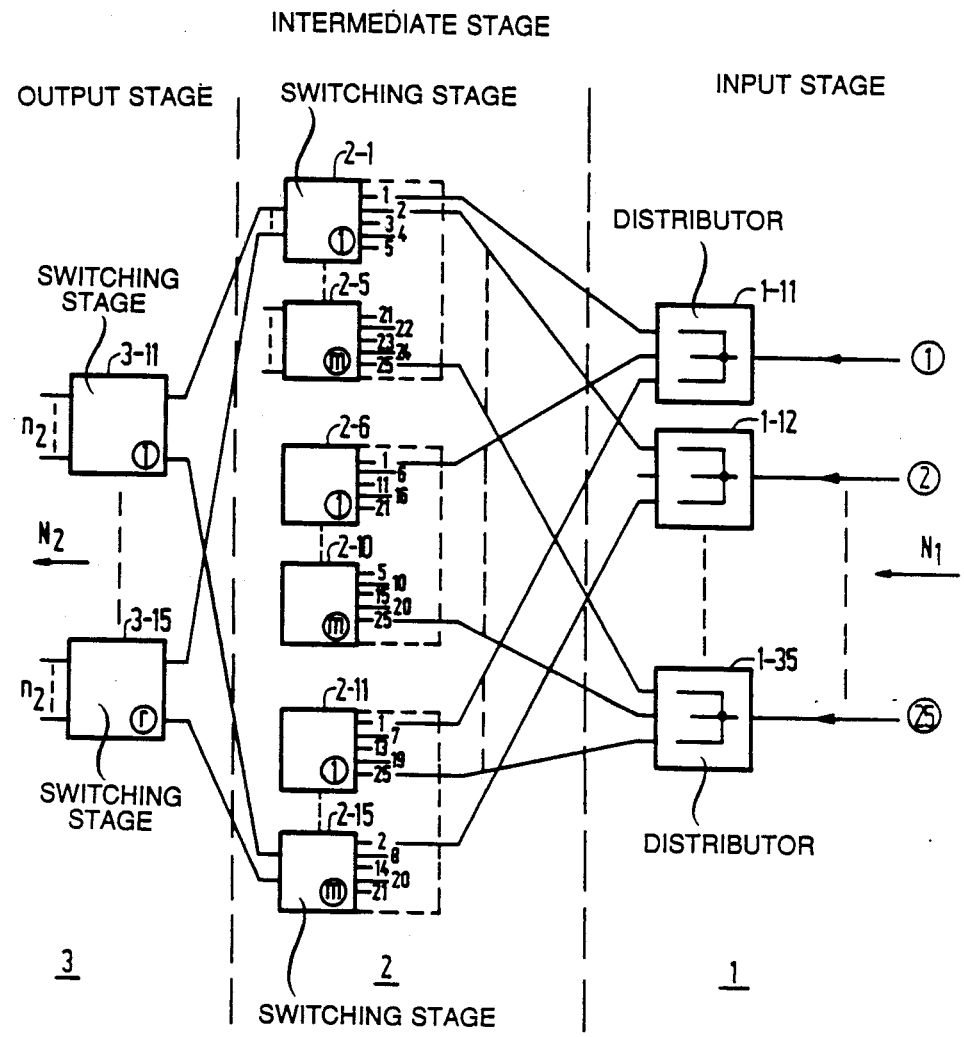

United States Patent [19]

van Baardewijk

[11] Patent Number: 4,849,964
[45] Date of Patent: Jul. 18, 1989

[54] MULTISTAGE SWITCHING SYSTEM FOR SWITCHING N1 INPUT CHANNELS TO N2 OUTPUT CHANNELS

[75] Inventor: Johannes van Baardewijk, Hilversum, Netherlands

[73] Assignee: AT&T and Philips Telecommunications B.V., Hilversum, Netherlands

[21] Appl. No.: 142,051

[22] Filed: Jan. 7, 1988

[30] Foreign Application Priority Data

Jan. 16, 1987 [NL] Netherlands ............... 8700100

[51] Int. Cl.$^4$ ................................. H04Q 11/04
[52] U.S. Cl. ................................. 370/63; 370/58
[58] Field of Search ................... 370/63, 58, 64, 59

[56] References Cited

U.S. PATENT DOCUMENTS

| | | | |
|---|---|---|---|
| 4,097,693 | 6/1978 | Greefkes | 370/58 |
| 4,322,843 | 3/1982 | Beuscher et al. | 370/58 |
| 4,536,870 | 8/1985 | Bovo et al. | 370/63 |
| 4,569,043 | 2/1986 | Simmons et al. | 370/63 |

Primary Examiner—Douglas W. Olms
Attorney, Agent, or Firm—Lucian C. Canepa

[57] ABSTRACT

A switching system for switching-through in time-division multiplex broadcast connections and point-to-point connections. In prior art broadcast switching systems the incoming (transmitter) channels are fed with multiplicity into the switching system and distributed there in accordance with a distribution algorithm. This multiple feed-in is effected in the switching system of the invention in a time-division multiplex switching stage divided into parallel units as a result of which the switching rate of this stage does not become excessively high. In order to realise this parallel distribution of this time-division switching stage a certain restriction of the distribution algorithm must be tolerated.

It has been found that the switching system thus obtained is suitable for multislot connections, whilst it can also be rendered suitable for point-to-point connections by slightly extending it.

3 Claims, 3 Drawing Sheets

MULTISTAGE SWITCHING SYSTEM FOR SWITCHING N1 INPUT CHANNELS TO N2 OUTPUT CHANNELS

The invention relates to a switching system for switching $N_1$ input channels to $N_2$ output channels, comprising an input stage, at least one intermediate stage and an output stage,
in which the input stage is arranged for providing a multiple connection with multiplicity M of each input channel to the inputs of the intermediate stage in accordance with a given distribution rule in which the connection distribution of an input channel is independent of the routing of that channel by the switching system;
in which the output stage is composed of r ($r \geq 1$) sub-couple fields each having $n_2$ outputs, where $N_2 = rn_2$;
and in which the intermediate stage is in the form of a space-division switching stage having $M \times N_1$ incoming channels.

Such a switching system is disclosed in the periodical "IEEE Transactions on Communications", Vol. Com.-33 No. 10, October 1986, pages 1025–1035; the article published there has for its title "A two-stage rearrangeable broadcast switching network", by G.W. Richards and F.K. Hwang.

In said article (more specifically in FIGS. 1–5 and the associated text) a multistage switching system is described which is particularly suitable for through-switching of broadcast channels, that is to say a relatively small number of input channels (broadcast transmitters) is switched to a relatively large number of output channels (broadcast receivers). This switching system is comprised of an input stage, one or more intermediate stages and an output stage.

The input stage of the prior art switching system is not shown in the Figures of said article, but is constituted by a wire pattern by means of which it is accomplished that each input channel has a multiple appearance with multiplicity M at the inputs of the intermediate stage. So if there are $N_1$ input channels, the intermediate stage has $M \times N_1$ inputs. In addition, the multiplicity M depends on the number of input channels $N_1$ (see FIG. 7 of said article).

The intermediate stage, denoted $1^{st}$ stage in said article, is constituted in the prior art switching system by a plurality of sub-coupling fields, the number of fields depending on the number of input channels and the multiplicity. The input channels are distributed over the said couple fields in accordance with a given distribution rule. The distribution rule prescribes that no pair of input channels shall be connected to more than one sub-couple field of the intermediate stage. This choise of distribution rule accomplishes inter alia that the switching system operates in a non-blocking mode, which is particularly of importance, when, for example, television programs are switched-through.

The output stage of the prior art switching system is constituted by one or more sub-couple fields. Each sub-couple field of the intermediate stage is connected to each sub-couple field of the output stage. When there are p sub-couple fields of the intermediate stage and r sub-couple fields of the output stage, each sub-couple field of the intermediate stage consequently has r outputs and each sub-couple field of the output stage consequently has p inputs.

The switching system disclosed in said article is in the form of an array of space-division multiplex stages. Contemporary telecommunication systems prefer a time-division switching system.

To convert the prior art switching system into a time-division switching system, the input stage might be implemented as one single time-division switching stage. However in practice this results in a switching system which is not practicable as will be obvious from the following numerical example: let it be assumed that a switching system is required which is capable of switching-through 289 ($= 17 \times 17$) television channels; with this choice of $N_1$ a multiplicity $M=4$ is associated. The bit rate for the transmission of a television channel amounts to, for example, 34.8 Mb/s. The time-division multiplex stage which would have to replace the input stage of the switching system must consequently be capable of processing $289 \times 4 \times 34.8$ Mb/s, which corresponds to a switching time of approximately 0.025 ns/bit. Such a switching time cannot be realised in the present state of the art.

The invention has for its object to provide a switching system of the type defined in the opening paragraph in the form of a time-division multiplex system, in which the input stage is constituted by a time-division switching stage and in which the switching period of the switching element in this stage is technically realisable.

To that end the switching system according to the invention is characterized in that:
the input stage is formed by a number of $m \geq 2$ parallel input time-division stages to each of which $n_1$ input channels are connected, (so that $m \times n_1 = N_1$), these input time-division multiplex switching stages each being connected individually via its own output conductor to an associated input of the intermediate stage for applying $M \times n_1$ time channels thereto, the input time-division switching stages each including a control memory having a first memory portion whose content is determined by the predetermined distribution rule,
that the multiplicity M is less than or equal to the number of input time-division switching stages m,
that the intermediate stage is constituted by a space-division switching stage having m inputs and r outputs, which are switched at the rate of the input time-division switching stages, the space-division multiplex circuit including a routing memory whose content is determined by the routing of the channels to be switched,
and that each output sub-couple field is constituted by an output time-division multiplex switching stage having $n_2$ output channels which is connected via its own conductor to an associated output of the intermediate stage, the output switching stages each having a routing memory whose content is determined by the routing of the channels to be switched.

The $N_1$ input channels are equally distributed over the n parallel input time-division multiplex stages so that each input time-division multiplex stage receives $n_1$ input channels. As each input channel must appear M times on the intermediate stage, the number of input channels n is multiplied by M, so that $M \times n_1$ time channels appear in time-division multiplex on the output conductor via which they are applied to an intermediate stage input associated with that conductor. This results in the application possibilities of said distribution instruction being limited to some extent: an input channel incoming via, for example, the first input time-division multiplex stage can only be applied thereto via the first input of the intermediate stage. Consequently one of the distribution possibilities in accordance with the distribution rule cannot be used (if namely the sequence of the input channels is 1, 2, 3, ... $N_1$, then the following sequence of input channels cannot appear at the m inputs of the intermediate stage: [1, 2, ... m], [m+1, ... , 2m], ... [$N_1$−m+1, ... $N_1$]). Since in accordance with the known distribution instructions, the multiplicity M cannot be more than or equal to m+1, the multiplicity in the switching system according to the invention cannot be more than m.

Each input time-division multiplex stage includes a control memory. The information storing the distribution of the input channels over the input channels of the intermediate stage is stored in a first portion of this memory. Consequently, the content of this memory does not originate from the central control of the switching system as is the case for customary time-division multiplex switching stages, but is a result of the application of the distribution rule. If furthermore no influence whatsoever of this distribution is required, this first memory portion may be in the form of a read-only memory (ROM).

As the intermediate stage in the form of a space-division is switched at the rate of the input time-division multiplex switching stage, the intermediate switching stage assumes at any switching instant the switching configuration of each one of the sub-couple fields of the intermediate stage of the prior art space-division multiplex switching system. This switching configuration is controlled by the content of an associated routing memory which content, as is customary, originates from the central control of the switching system.

In accordance with a further feature, the switching system according to the invention is characterized in that the control memories of the input time-division multiplex switching stages each include a second memory portion connected to the central control of the system for applying routing information to that second memory portion for setting the input time-division multiplex stage in dependence on the required channel switch-through.

This measure achieves that the network according to the invention which was originally designed for broadcast switch-through is now also made suitable for what is commonly referred to as "point-to-point" connections, such as telephone connections. This effect is obtained at the cost of only a slight extension of the control memory of the input time-division multiplex switching stages.

In accordance with a further feature of the invention, the switching system is characterized in that the first memory portion is connected to the central control of the switching system for, previous to the setting-up of a channel switch-on, mutually exchanging the contents of at least two memory locations of said memory portion.

This measure accomplishes that the switching system according to the invention can be used also for what are commonly referred to as "multislot" connections that is to say a connection using more than one time slot within a frame. Such connections can, for example, be used for television transmission at a bit rate higher than the 34.8 Mb/s mentioned in the foregoing, so for the so-called "high definition T.V.". Because of the time-division multiplex switching stages provided in the system it is possible that a specific time slot sequence at the input of the system occurs as a different time slot sequence at the output. When only one time slot per frame is connected thsi phenomenon cannot occur, however for a connection utilising more time slots per frame it is possible to alter the information sequence, whereby the information is disturbed. Since the information about the change in the time slot sequence is known in the central control, it is possible to anticipate the time slot interchange by mutually interchanging the addresses of the time channels in the first memory portion, and thus to obtain the required time slot sequence at the output of the system.

The invention and how it can be put into effect will now be described in greater detail with reference to the accompanying Figures, corresponding elements having been given the same reference numerals.

Figure 2:
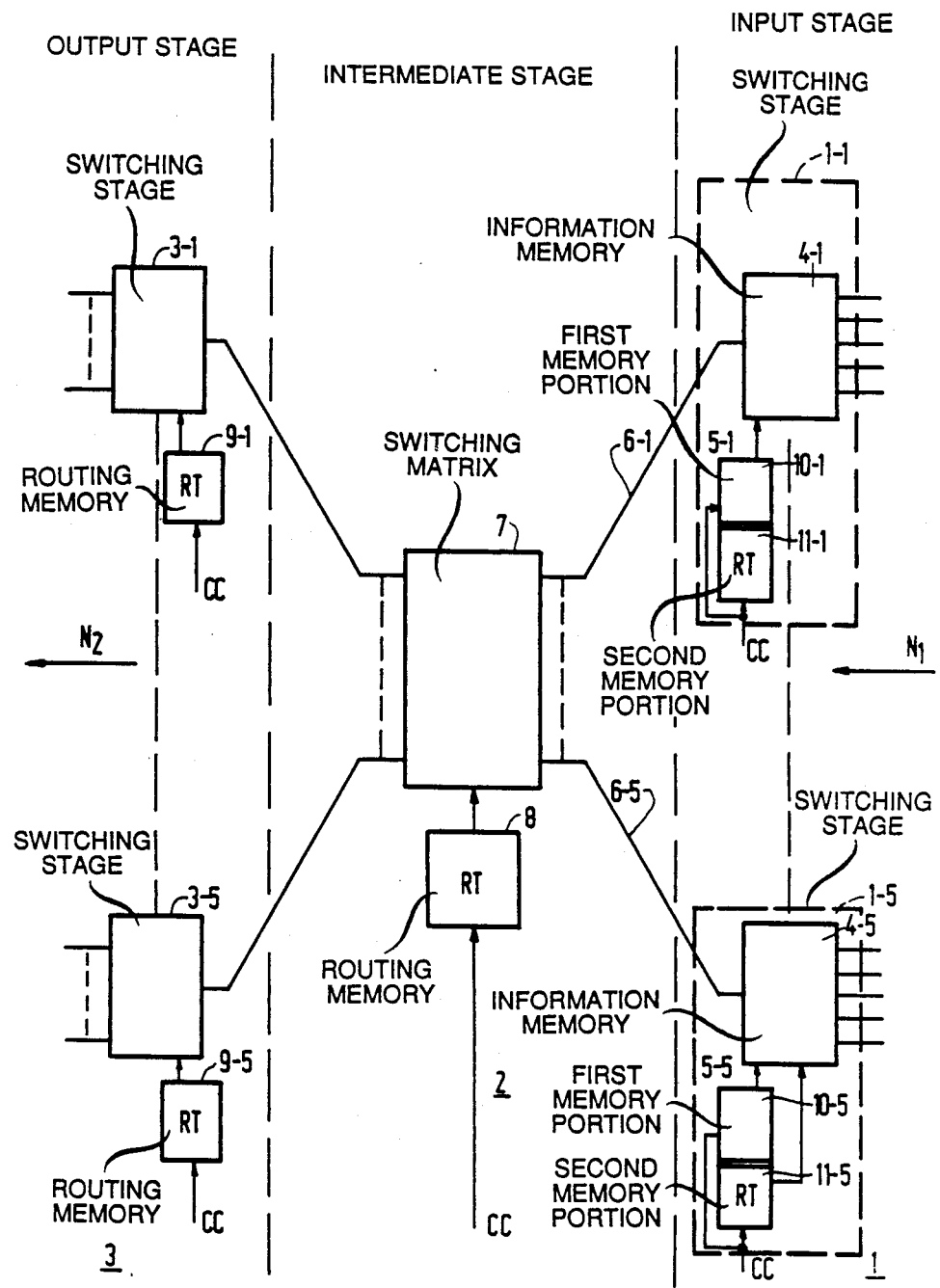
Figure 3:
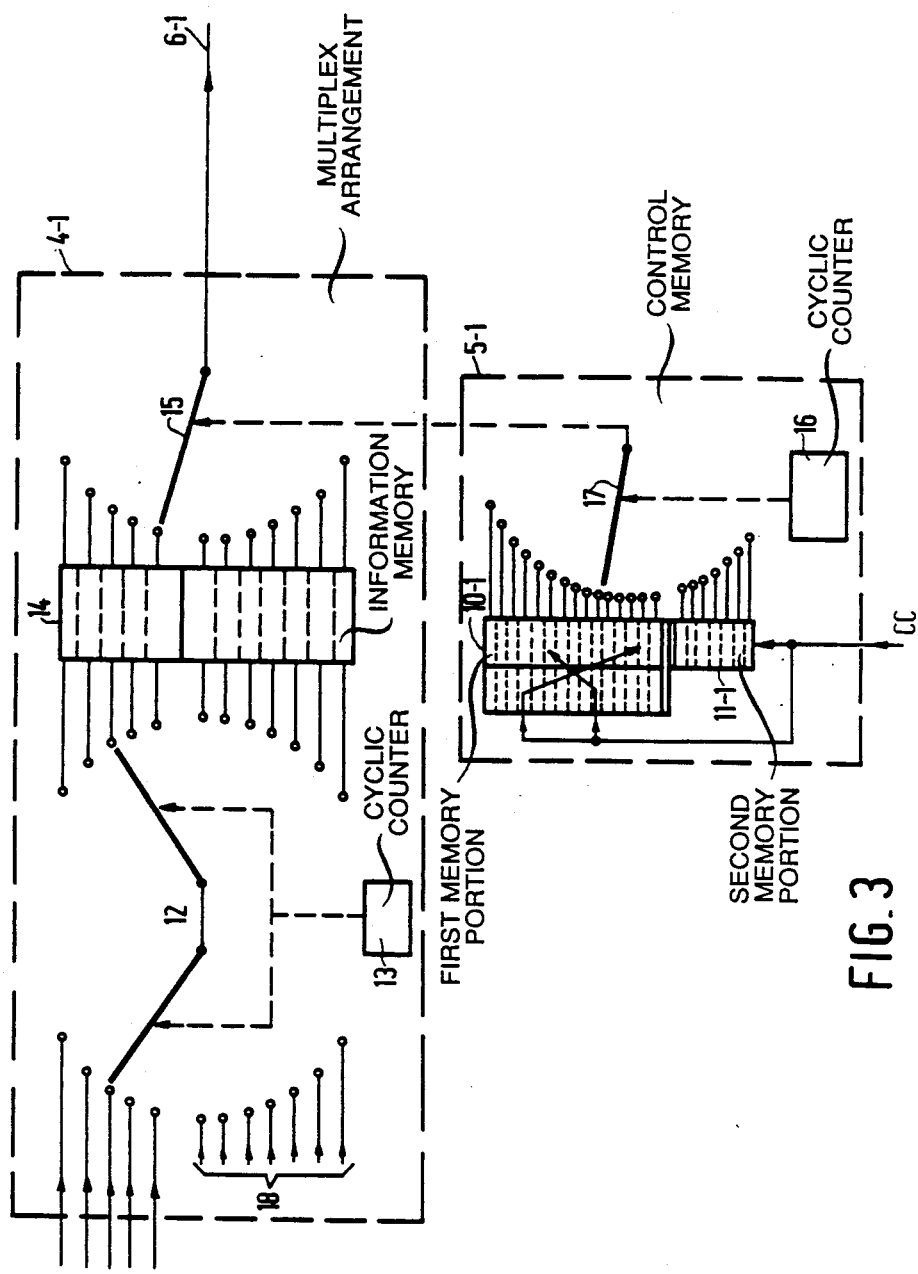

Therein:

FIG. 1: shows a switching system as known from the prior art;

FIG. 2: shows an embodiment of the switching system according to the invention;

FIG. 3 shows an embodiment of an input time-division multiplex switching stage of the switching system of FIG. 2.

The prior art switching system of FIG. 1 is capable of switching-through $N_1$ input channels to $N_2$ output channels. In this example $N_1$=25. Each of these input channels appears three times at the input of intermediate stage 2, so that the multiplicity M=3. This multiplicity is realised by means of an input stage 1 formed by a plurality of distributors (1-11) - (1-35).

Intermediate stage 2 is formed by three (M=3) groups of five sub-couple fields (2-1)–(2-15), in the form of space-division multiplex switching stages. Each sub-couple field has five inputs. The inputs are connected to these inputs in accordance with the distribution rule as known from the prior art. In accordance with this rule, no pair of inputs must be connected more than once to one sub-couple field of intermediate stage 2. The digits at the input of the sub-couple fields in FIG. 1 denote the numbers of the input channels connected thereto.

The multiplicity M is chosen in dependence of the number of input channels. A maximum value for M follows from the distribution rule. If the number of input channels is the square of a prime number (for example 25=$5^2$), then the multiplicity is maximally equal to that prime number plus one, consequently at most six in the numerical example used here. It is however alternatively possible to choose for M a value smaller than the maximum value.

Output stage 3 is assembled from a number r (for example r=5) of sub-couple fields (3-11)–(3-15), each having $n_2$ outputs, where $n_2$ may, for example, be 14. Each of these sub-couple fields is in the form of a space-division multiplex switching stage. Each of these sub-couple fields has one input connected to each subcouple field of intermediate stage 2, so that each subcouple field of the output stage has fifteen inputs.

FIG. 2 shows an embodiment of a switching system according to the invention in which the input stage 1 is in the form of a number of (for example five) parallel time-division multiplex switching stages (1-1)–(1-5). For example five inputs are connected to each of these time-division multiplex switching stages. Each of these time-division multiplex stages (1-$i$) is constituted by an information memory (4-$i$) to which a control memory (5-$i$) is connected.

Each of these time-division multiplex switching stages (1-*i*) is connected to an associated input of intermediate stage 2 via an output conductor (6-*i*). Intermediate stage 2 is constituted by a space-division multiplex switching stage 7 to which a routing memory 8 is connected.

Output stage 3 is connected to the outputs of intermediate stage 2. Output stage 3 is formed by a number of (for example five) time-division multiplex switching stages (3-*i*) which are each connected to an associated output of space-division switching stage 7 via a conductor of its own. Each of these time-switching stages receives a number of channels in time-division multiplex via these conductors. This number is equal to the number of time channels on the conductor (6-*i*). Each time switching stage (3-*i*) demultiplexes the signal on the associated conductors and applies the demultiplexed signals to the output of this time switching stage under the control of the routing memory associated with this time switching stage. Each time switching stage (3-*i*) includes a routing memory (9-*i*) for setting the time switching stage. The routing memory receives the routing information stored in it from the central control (C.C.) of the switching system. This occurs in the manner customary for this type of switching stages.

Time switching stage (1-*i*) receives five input channels which are combined into a time-division multiplex signal which is transmitted via conductor (6-*i*). When a multiplicity M of, for example, 3 is used, this multiplex signal is formed by 15 channels whose temporal sequence is prescribed by the known distribution rul. The control information ensueing from this distribution instruction is stored in a first memory portion (10-*i*) of control memory (5-*i*).

Since in principle the distribution rule is independent of the channel switch-through, so independent of the routing, this memory portion (10-*i*) may be in the form of a ROM. A connection of this memory portion to the central control C.C. of the switching system is then absent. The switching system according to the invention provides however also a possibility of forming multislot connections. In that case it is important that the time-slot sequence of an incoming signal is preserved on switch-through of that signal by the switching system. This sequence can be disturbed (in a given manner) on switch-through. To remove this disturbance, it is possible to effect in the memory portion (10-*i*) an anticipatory interchange of the content of the relevant memory locations. If, for example, for a multislot connection the incoming time slot sequence is 1, 2, 3, 4, and the outgoing time slot sequence would be 3, 1, 4, 2, then the anticipatory interchange is to effect that the incoming sequence becomes 2, 4, 1, 3, so that after switch-through the outgoing sequence becomes 1, 2, 3, 4, which is the required sequence. To render this anticipatory interchange possible, memory portion (10-*i*) is connected to the central control C.C. It will be obvious that in that case the memory portion (10-*i*) cannot be a ROM.

To provide in the switching system of FIG. 2 also the possibility to realize point-to-point connections (for example for telephony), control memory (5-*i*) includes a second memory portion (11-*i*) in which the routing information for this last-mentioned type of connections is stored. To that end memory portion (11-*i*) is connected to the central control C.C., to receive routing information with which time switching stage (11-*i*) is set. Naturally, to render point-to-point connections possible, still further input channels, for example 7 channels, must be assumed to be present in addition to the input channels of FIG. 2, for the supply of information of this point-to-point communication. Then the multiplex signal on conductor (6-*i*) will consist of 15+7=22 time channels. An embodiment of time switching stage (1-*i*) will be described in greater detail with reference to FIG. 3 in which also a number of input channels is incorporated for point-to-point connections.

Intermediate stage 2 includes a space-division multiplex switching matrix 7 which is set to different switching configurations at the rate of the time slots incoming via the conductors (6-*i*). The switching configuration this switching matrix 7 assumes, is controlled by routing memory 8 whose content is received from the central control. This routing information is fully determined by the required channel switch-through. Under the control of routing memory 8, switching matrix 7 assumes, one after the other, the switching configurations of the sub-coupling fields (2-1) to (2-15) of FIG. 1 (at the same switch-through state between the input and output channels).

FIG. 3 illustrates in greater detail a time-division multiplex switching stage (1-*i*), for example (1-1). This time switching stage includes a multiplex arrangement (4-1), comprised of a supply switch 12 and a cyclic counter 13 for controlling supply switch 12. The two arms of switch 12 move in synchronism and to corresponding contacts, so that the information of the $j^{th}$ incoming line is applied to the $j^{th}$ position of information memory 14. Cyclic counter 13 has as many positions as there are incoming lines; memory 14 has the same number of memory locations. As is customary, counter 13 is controlled by a central system clock. The group of incoming lines consists of a first sub-group of five lines, also shown in FIG. 2, which, in accordance with the distribution rule, are applied with multiplicity to intermediate stage 2 of FIG. 2, and a second sub-group 18 of, for example, seven lines intended for point-to-point switch-through. (this sub-group 18 is not shown in FIG. 2).

The outputs of information memory 14 are connected to a selector switch 15 which is controlled by a control memory (5-1). The content of the information memory 14 is applied in time-division multiplex to output conductor (6-1), the time slot sequence of the multiplex signal being determined by control memory (5-1).

The control memory (5-1) includes an address memory in which the addresses of the memory locations of the information memory are stored, and a control section for controlling the selector switch 15.

The address memory consists of a first memory portion (10-1) and a second memory portion (11-1). The first memory portion (10-1) is intended for storage of the addresses to be assigned to applying the first sub-group of five incoming lines to the intermediate stage 2 (FIG. 2) with a multiplicity M=3. Consequently, this memory portion has 3×5=15 memory locations. The content of this address portion is consequently further determined by said distribution rule, so that this content is not supplied by the central control C.C. As has already been mentioned in the foregoing, the central control can indeed exercise an influence on the sequence of the content of this address portion in the event of a multislot connection. This possibility is symbolically illustrated in FIG. 3 by means of a control connection from the central control which, after some positions of the first register of memory portion (10-1) have been interchanged, stores the content thereof in the second register of (10-1).

The second memory portion (11-1) contains the routing information for the point-to-point connections of incoming lines 18. As these lines must be switched through without multiplicity to intermediate stage 2 (FIG. 2), memory portion (11-1) has as many locations as there are incoming lines, i.e. seven locations.

The control section of control memory (5-1) is constituted by a cyclic counter 16 controlling a switch 17. Cyclic counter 16 has as many counting positions as there are outputs of the address memory (10-1) and (11-1), so twenty-two positions.

The control memory (14-1) operates as follows: let the incoming lines have information samples which must be written in information memory 14. This writing operation is effected in that under the control of cyclic counter 13 switch 12 periodically connects each of the incoming lines to a corresponding memory location in memory 14. Consequently counter 13 has $5+7=12$ counting positions.

The information samples in memory 14 are to appear as a time-division multiplex signal on conductor (6-1). To that end the selector switch 15 is periodically connected to the outputs of memory 14 under the control of control memory (5-1). The content of the consecutive memory locations of address memory (10-1), (11-1) are cyclically read under the control of cyclic counter 16 (consequently cyclic counter 16 has $15+7=22$ counting positions). The contents of these memory locations are formed by the addresses of memory 14, so that a location of memory 14 is assigned to each counting position of counter 16, as a result of which this content is transferred to conductor (6-1). In order to transfer the incoming information flow to the conductor (6-1) at the same rate, counter 16 must consequently have a counting rate which is 22/12 times higher than counter 13.

What is claimed is:

1. A switching system for switching $N_1$ input channels to $N_2$ output channels, comprising an input stage, at least one intermediate stage and an output stage in which the input stage is arranged for providing a multiple connection with multiplicity M of each input channel to the inputs of the intermediate stage in accordance with a given distribution rule, in which the connection distribution of an input channel is independent of the routing of that channel by the switching system, in which the output stage is composed of r, where $r \geq 1$, sub-coupling fields each having $n_2$ outputs, where $N_2 = rn_2$;

and in which the intermediate stage is in the form of a space-division switching stage having $M \times N_1$ incoming channels;

characterized in that the input stage is formed by a number of m, where $m \geq 2$, parallel input time-division stages to each of which $n_1$ input channels are connected, so that $m \times n_1 = N_1$, those input time-division multiplex switching stages each being conducted individually via its own output conductor to an associated input of the intermediate stage for applying $M \times N_1$ time channels thereto, the input time-division switching stages each including a control memory having a first memory portion whose content is determined by the predetermined distribution instruction, in that the multiplicity M is less than or equal to the number of input time-division switching stages m, that the intermediate stage is constituted by a space-division switching stage having m inputs and r outputs which are switched at the rate of the input time-division switching stages, the space-division multiplex circuit including a routing memory whose content is determined by the routing of the channels to be switched through, and in that each output sub-coupling field is constituted by an output time-division multiplex switching stage having $n_2$ output channels, which is connected via its own conductor to an associated output of the intermediate stage, the output switching stages each including a routing memory whose content is determined by the routing of the channels to be switched through.

2. A switching system as claimed in claim 1, characterized in that the control memories of the input time-division switching stages each include a second memory portion connected to the central control of the system for applying to that second memory portion routing information for setting the input time-division switching stage in dependence on the required channel switch-through.

3. A switching system as claimed in claim 1, characterized in that the first memory portion is connected to the central control of the switching system for, prior to effecting a channel switch-through, effecting a mutual interchange of the content of at least two memory locations of that memory portion.

* * * * *